Patented Nov. 12, 1946

2,410,820

UNITED STATES PATENT OFFICE 2,410,820

PRODUCTION OF VINYL CYANIDE

Charles R. Harris, Lockport, N. Y., assignor to E. I. du Pont de Nemours & Company, Wilmington, Del., a corporation of Delaware No Drawing. Application January 12, 1944, Serial No. 518,013

7 Claims. (Cl. 260—464)

This invention relates to the production of vinyl cyanide and has as its object a novel method for producing this chemical.

In accordance with my invention, I subject succinonitrile vapor to pyrolysis at a temperature within the range of about 300–700° C., whereby I have discovered that vinyl cyanide is formed in good yield by the following reaction:

$$CNCH_2CH_2CN \rightarrow CH_2CHCN + HCN$$

The reaction is endothermic.

In a preferred mode of practicing my invention, succinonitrile is heated to form vapor which is passed through a heated reactor or passed over any suitable heated surface. If desired, a catalytic surface may be used, for example, a carbonaceous material such as coke, charcoal or activated carbon, or alumina, silica gel or the like. I have also found that alkali metal cyanides act as catalysts for the reaction. These may be supported on granular, infusible solids such as charcoal or the other solid materials mentioned above. For this purpose I may use the cyanides of sodium, potassium, lithium, cesium, or rubidium, or mixtures thereof. Preferably, I use a mixture of sodium and potassium cyanide containing not less than 10% of either one. Also I prefer to carry out the pyrolysis reaction at a temperature between the melting point of the cyanide or cyanide mixture and about 700° C. I have obtained my best results by using glowed wood charcoal which has been impregnated with an alkali metal cyanide.

However, excellent yields may be obtained without the use of any catalyst, especially at temperatures of 500–650° C. Some formation of vinyl cyanide will occur when the succinonitrile is pyrolyzed at temperatures as low as 300° C., but below this temperature the yield becomes too low to be of commercial importance. I prefer not to exceed a temperature of about 700° C. to avoid excessive, undesired decomposition reactions.

I prefer to carry out the reaction in the presence of an inert diluent gas such as hydrogen or nitrogen. Such gas may be mixed with succinonitrile vapors and the vapor-gas mixture subjected to the pyrolyzing temperature, or the gas may be separately introduced into the reaction space. The amount of diluent gas may be varied over a wide range, e. g., from 10% to 90% by volume of the vapor-gas mixture. Ordinarily, a mixture of about 50% diluent gas is preferred.

The following example further illustrates my invention:

Example

A vertical stainless steel tube provided with an inlet at the top and an outlet at the bottom was arranged to be heated in an electric furnace. A layer of small porcelain Raschig rings was placed in the bottom of the tube to serve as a support for any desired layer of catalyst. Above the catalyst was placed a three-inch layer (75 cc.) of glass beads. When no catalyst was used, the glass beads rested on the Raschig rings. A thermocouple was provided for measuring the temperature in the catalyst layer.

In operation the tube was heated to an inside temperature of 300 to 700° C., and a slow stream of molten succinonitrile was introduced in the top of the tube onto the glass beads. The succinonitrile was rapidly vaporized on contact with the hot glass beads, and the vapors were immediately subjected to the pyrolyzing temperature. The succinonitrile vapors were diluted with hydrogen which was introduced in the top of the reaction tube, above the glass beads. In a series of runs the following catalysts were used:

| Run | Catalyst |
|---|---|
| A | 300 cc. of alumina pellets. |
| B | 300 cc. of alumina pellets impregnated with 10% by weight of a 50-50 mixture of sodium and potassium cyanide. |
| C | 75 cc. of 4-8 mesh size wood charcoal impregnated with about 15% by weight of a 50-50 mixture of sodium and potassium cyanides. |
| D | 12.5 cc. of the catalyst of run C. |
| E | 75 cc. of wood charcoal, 4-8 mesh size. |
| F | None. |
| G | Do. |
| H | 150 cc. of the catalyst of run C. |

The following results were obtained:

| Run | Succinonitrile input | Hydrogen input | Reaction temperature | Succinonitrile converted to vinyl cyanide |
|---|---|---|---|---|
|  | Gms./min. | Cc./min. | ° C. | Per cent |
| A | 3.5 | 1,000 | 530 | 52.2 |
| B | 3.5 | 1,000 | 525 | 73.8 |
| C | 3.5 | 1,000 | 525 | 90.9 |
| D | 3.5 | 1,000 | 620-658 | 88.5 |
| E | 3.5 | 1,000 | 525 | 71.8 |
| F | 3.5 | 1,000 | 640-650 | 94.0 |
| G | 3.5 | 600 | 602-650 | 89.2 |
| H | 3.5 | None | 550-590 | 72.9 |

I claim:

1. A process for the production of vinyl cyanide which comprises subjecting succinonitrile vapor to pyrolysis at a temperature of about 300 to 700° C. in the presence of a catalyst comprising an alkali metal cyanide on a solid support.

2. A process for the production of vinyl cyanide which comprises subjecting succinonitrile vapor to pyrolysis at a temperature of about 300 to 700° C. in the presence of a catalyst comprising charcoal impregnated with at least one alkali metal cyanide.

3. A process for the production of vinyl cyanide which comprises subjecting succinonitrile vapor to pyrolysis in the presence of a catalyst comprising a carbonaceous support impregnated with at least one alkali metal cyanide at a temperature within the range of about 300 to 700° C. which is above the melting point of said cyanide.

4. A process for the production of vinyl cyanide which comprises subjecting succinonitrile vapor to pyrolysis in the presence of a catalyst comprising charcoal impregnated with a mixture of sodium and potassium cyanides at a temperature within the range of 500 to 650° C. which is above the melting point of said mixture.

5. A process for the production of vinyl cyanide which comprises subjecting succinonitrile vapor together with an inert gas to pyrolysis at a temperature of about 300° C. to 700° C. in the presence of a catalyst comprising an alkali metal cyanide on a solid support.

6. A process for the production of vinyl cyanide which comprises subjecting succinonitrile vapor together with hydrogen to pyrolysis at a temperature of about 300° C. to 700° C. in the presence of a catalyst comprising an alkali metal cyanide on a solid support.

7. A process for the production of vinyl cyanide which comprises subjecting succinonitrile vapor together with hydrogen to pyrolysis at a temperature of about 500° C. to 650° C. in the presence of a catalyst comprising an alkali metal cyanide on a solid support.

CHARLES R. HARRIS.